United States Patent [19]

Bank et al.

[11] Patent Number: 5,225,510

[45] Date of Patent: Jul. 6, 1993

[54] MASONRY TREATING COMPOSITION AND METHOD

[75] Inventors: Howard M. Bank, Freeland; Richard D. Meindertsma, Midland, both of Mich.

[73] Assignee: Dow Corning Corporation, Midland, Mich.

[21] Appl. No.: 913,335

[22] Filed: Jul. 15, 1992

[51] Int. Cl.$^5$ ............................................. C08G 77/06
[52] U.S. Cl. ..................................... 528/12; 528/14; 528/21; 556/466
[58] Field of Search .......................... 528/12, 14, 21; 556/466

[56] References Cited

U.S. PATENT DOCUMENTS

| | | | |
|---|---|---|---|
| 4,485,130 | 11/1984 | Lampin et al. | 528/21 |
| 4,539,232 | 9/1985 | Burzynski et al. | 528/12 |
| 4,716,051 | 12/1987 | Rodder | 427/136 |

*Primary Examiner*—Melvyn I. Marquis
*Attorney, Agent, or Firm*—James L. Decesare

[57] ABSTRACT

A composition which is an anhydrous organic solvent free mixture of a hydrolyzable silane monomer; silanols formed by hydrolysis of the silane monomer; alkoxy functional oligomers formed by condensation of the silanols such as dimers and trimers; and higher alkoxy functional oligomers such as tetramers. Methods of making and using the composition are described.

11 Claims, No Drawings

MASONRY TREATING COMPOSITION AND METHOD

BACKGROUND OF THE INVENTION

This invention relates to a composition and to a method of preparing a composition useful in the treatment of porous surfaces such as masonry. More particularly, the composition contains a hydrolyzable silane monomer, silanols, and alkoxy functional oligomers, and the composition is anhydrous and essentially organic solvent free.

The advent of Federal and State regulations directed to environmental concerns particularly in the area of architectural coatings has created the need for solventless compositions. Solvent free architectural coatings containing silanes are known in the art as evidenced by U.S. Pat. No. 4,716,051 issued Dec. 29, 1987. In the '051 patent, one hundred percent of a pure solvent free alkyltrialkoxysilane is applied to the surface of concrete to render the surface hydrophobic. The present invention is an improvement over this technology, and provides a treating composition which is anhydrous as well as being solventless or free of organic solvent, while at the same time including in addition to a silane monomer, silanols and alkoxy functional oligomers thereof. The prehydrolyzed composition of the present invention will generate less organic alcohol liberated during further hydrolysis of alkoxy groups upon contact with moisture, thereby rending the composition of the present invention more environmentally acceptable. Since the compositions are anhydrous, stability problems during storage of the composition prior to its use caused by decomposition in aqueous medium are reduced. Thus, the compositions will remain stable for a sufficient time to make it economically feasible to employ these materials in coating applications.

SUMMARY OF THE INVENTION

The invention is directed to a composition for the treatment of porous surfaces such as masonry which is an anhydrous organic solvent free mixture containing (i) a hydrolyzable silane monomer; (ii) silanols of the silane monomer formed by partial hydrolysis thereof; (iii) lower alkoxy functional oligomers formed by partial condensation of the silanols including dimers and trimers thereof; and (iv) higher alkoxy functional oligomers formed by partial condensation of the silanols including tetramers thereof.

The invention is further directed to a method of preparing the above described composition. The method involves the steps of forming a solution by combining water with a hydrolyzable silane monomer in a range of 0.1 to 0.6 moles of water per mole of silane monomer in the presence of an acid catalyst, and partially hydrolyzing the silane monomer to form silanols and alcohol while simultaneously partially condensing the silanols to form alkoxy functional oligomers; neutralizing the solution by adding a mild base to the solution; heating the solution to a temperature sufficient to strip the alcohol from the solution; and separating any excess mild base and any neutralization products from the solution. The product isolated is an anhydrous organic solvent free mixture of residual hydrolyzable silane monomer, residual silanols, and lower alkoxy functional oligomers including dimers, trimers, and higher alkoxy functional oligomers including tetramers.

The invention in addition is directed to a method of treating a porous surface such as masonry for the purpose of rendering it hydrophobic by applying to the porous surface a composition which is an anhydrous organic solvent free mixture of a hydrolyzable silane monomer, silanols, and lower and higher alkoxy functional oligomers such as dimers, trimers, tetramers.

It is an object of the present invention to provide a masonry treating composition and method of application which is environmentally acceptable under current Federal and State architectural coating regulations.

It is also an object of the present invention to provide a method of making a masonry treating composition in which a critical range of moles of water per mole of silane monomer results in the provision of an end product which is anhydrous and organic solvent free and more in compliance with environmental standards of current Federal and State architectural coating regulations.

These and other features, objects and advantages of the herein described present invention will become more apparent from a consideration of the following detailed description thereof.

DETAILED DESCRIPTION OF THE INVENTION

Typically, the hydrolysis of the alkoxy groups of an organotrialkoxysilane requires molecular contact of water with the alkoxysilane in the presence of an acid or a base catalyst. Organotrialkoxysilanes are commonly dissolved in water by shaking or stirring vigorously with acidified water until a clear solution results. Trialkoxysilanes of the formula $RSi(OR')_3$ hydrolyze stepwise in water to the corresponding silanols which condense to siloxanes. The hydrolysis is relatively rapid while the condensation reaction is slower.

The reaction is typically conducted in the presence of an acid catalyst which accelerates the hydrolysis. Preferred acid catalysts are hydrochloric, acetic, oxalic and trichloroacetic acids, with hydrochloric acid being in the most preferred. A strong basic catalyst may also be employed. Representative strong bases are sodium hydroxide and sodium methylate.

For purposes of the present invention, the hydrolyzable silane monomer $RSi(OR')_3$ is an organotrialkoxysilane or a mixture of organotrialkoxysilanes such as alkyltrialkoxysilanes having $C_1$ to $C_{20}$ alkyl groups on silicon; aryltrialkoxysilanes; arylalkyltrialkoxysilanes; and halogen substituted derivatives thereof. Representative compounds which may be employed in accordance with the present invention are methyltrimethoxysilane, ethyltrimethoxysilane, propyltrimethoxysilane, isopropyltrimethoxysilane, butyltrimethoxysilane, isobutyltrimethoxysilane, pentyltrimethoxysilane, hexyltrimethoxysilane, phenyltrimethoxysilane, phenylethyltrimethoxysilane, chlorophenyltrimethoxysilane trifluoropropyltrimethoxysilane, and chloropropyltrimethoxysilane.

In addition to the foregoing compounds $RSi(OR')_3$, there may also be employed silanes in which R' is represented by an alkyl group having one to eight carbon atoms, preferably, one to four carbon atoms, or organotriaryloxysilanes where R' is phenyl. Thus, appropriate hydrolyzable silane monomers for purposes of the present invention may include the various ethoxy, isopropoxy, and phenoxy derivatives of the several silanes enumerated previously. In addition, mixtures of the silanes may be employed where it is desired to produce co-oligomeric products. In this event, the mixture can for example include a combination of an alkyltrialkoxysilane such as isobutyltrimethoxysilane, with a halogen substituted derivative such as trifluropropyltrimethoxysilane. While this is the preferred combination, it should be understood that other various mixture combinations may be utilized.

Following hydrolysis and condensation, the solution must be freed of hydrochloric acid and this is accomplished by neutralization with a mild base such as calcium carbonate in contrast to strong bases such as sodium hydroxide and sodium methylate, although other neutralizing agents classified as mild bases may be employed such as sodium carbonate, sodium bicarbonate, ammonium carbonate, sodium borate, sodium acetate, calcium acetate, calcium hydroxide, potassium acetate, and ammonium acetate. A mild base is required because over-neutralization with a strong base can create a product which is unstable. Following neutralization, the solution is distilled to remove the byproduct alcohol formed during hydrolysis, and the distilled solution is filtered in order to separate the excess neutralizing agent and any neutralization products from the final composition.

A critical feature of the present invention resides in the particular amount of water employed for the hydrolysis in relation to the amount of silane monomer. It has been found that compositions in accordance with the present invention may be produced by employing a very specific and limited range of moles of water per mole of silane, which range may vary between 0.1 to 0.6 moles of water per mole of silane. The range preferred is 0.25 to 0.5 moles of water per mole of silane, with the most preferred amount for this application being 0.5 moles of water per mole of silane. Lower amounts of water favor the formation of the lower alkoxy functional oligomeric dimers and trimers, while high amounts of water provide higher alkoxy functional oligomers such as the tetramers, pentamers, and higher species.

Thus, a process suitable for the preparation of compositions in accordance with the present invention is carried out by the steps of forming a solution by combining a limited amount of water to a neat hydrolyzable silane monomer in the presence of an acid catalyst; stirring the solution; neutralizing the solution; stripping byproduct alcohol from the solution by heating the solution at atmospheric pressure to a temperature of about 150 degrees Centrigrade; and separating from the solution any solid byproducts. Condensation of the hydroxyl radicals formed by hydrolysis of the silane monomer may be facilitated by applying external heat to the aqueous reaction solution for a period of time prior to neutralization.

Where a limited amount of water in the range of 0.1 to 0.6 moles of water per mole of silane is employed in the process as outlined above, the final composition produced will constitute an anhydrous organic solvent free mixture which includes 10.0 to 65.0 percent by weight of residual hydrolyzable silane monomer; more than zero but less than about 0.1 percent by weight of residual silanol; 25.0 to 80.0 percent by weight of lower alkoxy functional oligomers including dimers and trimers; and 0.25 to about 10.0 percent by weight of higher alkoxy functional oligomers including tetramers.

By employing a limited amount of water, the scenario described hereinabove is altered, and the hydrolysis and condensation reaction results in products being formed in accordance with the following reaction scheme:

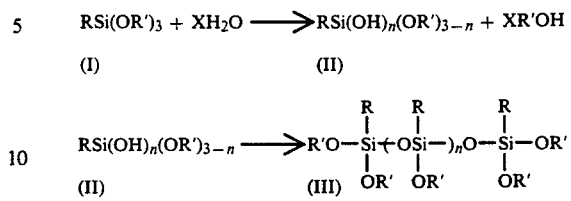

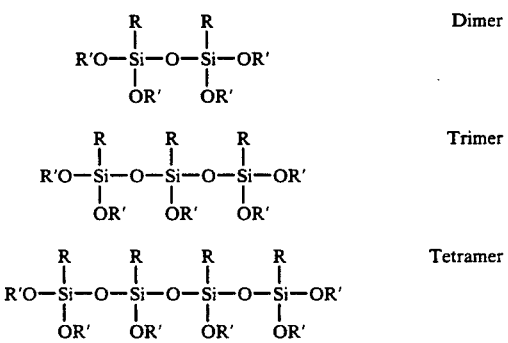

The lower and higher alkoxy functional dimer, trimer, and tetramer, are shown below:

$$\begin{array}{c} R \quad\quad R \\ | \quad\quad | \\ R'O-Si-O-Si-OR' \\ | \quad\quad | \\ OR' \quad OR' \end{array} \quad \text{Dimer}$$

$$\begin{array}{c} R \quad\quad R \quad\quad R \\ | \quad\quad | \quad\quad | \\ R'O-Si-O-Si-O-Si-OR' \\ | \quad\quad | \quad\quad | \\ OR' \quad OR' \quad OR' \end{array} \quad \text{Trimer}$$

$$\begin{array}{c} R \quad\quad R \quad\quad R \quad\quad R \\ | \quad\quad | \quad\quad | \quad\quad | \\ R'O-Si-O-Si-O-Si-O-Si-OR' \\ | \quad\quad | \quad\quad | \quad\quad | \\ OR' \quad OR' \quad OR' \quad OR' \end{array} \quad \text{Tetramer}$$

The compositions of the present invention may be employed in the treatment of various porous surfaces. While intended primarily for the treatment of concrete and masonry products, other porous surfaces which may be treated encompass textiles; paper; paperboard; leather products; and cellulosic materials.

Concrete and masonry surfaces which may be treated include heavy and light weight concrete; gypsum; concrete blocks; soft mud bricks; sand lime bricks; drain tiles; ceramic tiles; sandstone; plaster; clay bricks; natural stones and rocks; roofing tiles; calcium silicate bricks; asbestos cement; slag stones and bricks; stucco; limestone; macadam; marble; grout; mortar; terrazzo; clinker; pumice; terra cotta; porcelain; adobe; coral; dolomite; and asphalt. Noncementitious surfaces which are porous are included such as perlite; cellular glass; vermiculite; mica; and diatomaceous earth.

Examples of leather products suitable for treatment are garments, shoes and boots. Textiles include awnings, tents, tarpaulins, rainwear, covers, slickers, canvas, asbestos, fiberglass, natural fibers, peat moss, natural and synthetic yarns, woven and nonwoven materials, carpets, and carpet fibers. Porous cellulosic surfaces suitable for treatment with the compositions of the present invention are wood, wood products, fiberboard, cedar, redwood, fir, plywood, and structural timbers.

The compositions in accordance with the present invention liberate only limited amounts of volatile materials, and hence comply with various of the local, state and federal regulations regarding "volatile organic content" and "volatile organic compounds". Such regulations typically prohibit a volatile organic content for an architectural coating for example in excess of about four hundred grams per liter. In contrast, many coatings of the prior art containing solvent based alkoxysilanes liberate significant amounts of an alcohol which is a volatile organic compound. The volatile organic content of such prior art solvent based coatings can be of the order of magnitude of 650-700 grams per liter. Air pollution regulations limit the amount of organic solvents that can be discharged into the atmosphere. The term used for solvents is "volatile organic compounds" (VOC). A volatile organic compound (VOC) is defined as any compound of carbon that has a vapor pressure greater than 0.1 millimeter of mercury at a temperature of twenty degrees Centigrade and a pressure of 760 millimeters mercury.

"Volatile organic content" has been defined as the amount of volatile organic compounds (VOC) liberated from a coating as determined by ASTM D3690 and EPA Reference Method 24 which are standard industrial tests. Under the definition, a volatile organic compound is any compound which enters the atmosphere and photochemically reacts in the atmosphere with nitrogen oxides to reduce ozone and form photochemical smog.

Reduction of VOC has been mandated in several states and regulations in California for example require less than about four hundred grams of volatiles per liter of product to enter the atmosphere. This can be determined by baking ten grams of a product in an oven at one hundred-ten degrees Centigrade for one hour. The amount of solids which remain is subtracted from the total of the ten grams which was tested. Calculations are based on the weight of the volatiles that have evaporated which is reported as grams per liter.

The federal Environmental Protection Agency (EPA) has identified over sixty different volatile organic compounds that are used in consumer products. The more common solvents found in consumer products are ethanol, isopropyl alcohol, kerosene, and propylene glycol, as well as hydrocarbon solvents such as isobutane, butane, and propane which are employed as propellants.

Some states have proposed standards which would limit and reduce the amount of volatile organic compounds (VOC) permitted in various consumer products such as chemically formulated products used by household and institutional consumers including detergents; cleaning compounds; polishes; floor products; cosmetics; personal care products; home, lawn and garden products; disinfectants; sanitizers; and automotive specialty products. These standards would effect such widely used consumer products as shaving lather, hairspray, shampoos, colognes, perfumes, aftershave, deodorants, antiperspirants, suntan preparations, lotions, breath fresheners, and room deodorants.

Thus, the need for new and novel formulations and techniques for reducing organic emissions should be more than apparent.

The porous surface to be treated can be coated with the solution of the present invention by brushing, dipping or spraying techniques, and thereafter the solution is allowed to migrate within the surface. Further hydrolysis and condensation may occur because of moisture in the atmosphere and moisture contained in the porous surface itself, or because of the highly alkaline nature of the surface being treated. When applied to a porous surface such as masonry, the alkoxy functional oligomers (III) are capable of reacting with OH groups present within the surface. The presence in the composition of residual silanol (II) will tend to increase the hydrogen bonding and provide the benefit of lowering the evaporation of the composition from the substrate. The silanols (II) will also enable the composition to become bound to the substrate more rapidly.

The following examples are set forth in order to further illustrate the concepts embodied in the present invention.

EXAMPLE I

Into a one thousand milliliter flask there was added 2.6 gram moles of isobutyltrimethoxysilane (IBTMS). The contents of the flask was agitated and there was added to the flask 3.5 grams of a thirty-six percent hydrochloric acid solution for the purpose of catalyzing the hydrolysis. Water was slowly added to the flask at ambient temperature (25 degrees Centigrade) in the amount of 1.2 gram moles. As shown in Table I, three water ratios were evaluated as indicated by Samples A–D. Sample "B" it is noted contained 1.5 times the amount of hydrochloric acid as Samples "A", "C", and "D". The reaction mixture exotherm during the addition of water to the flask and the maximum temperature attained was thirty-nine degrees Centigrade. The mixture was allowed to equilibrate at ambient temperature for four hours. The composition of the hydrolysis products for the four samples A–D are shown in Table I. As previously noted, the preferred method for neutralizing the acid catalyst following hydrolysis is by the use of a mild base such as calcium carbonate. Accordingly, seven grams of calcium carbonate was added to the agitated flask. For purposes of comparison, 3.8 grams of sodium methylate ($CH_3ONa$) a strong base, was used to neutralize the catalyst in Sample "G" as shown in Table I. Sodium methylate caused deviations from the neutral point and produced an unstable product during the distillation phase. Seven grams of activated charcoal was used for the removal of chromophors from the product. The mixture was allowed to equilibrate at ambient temperature for four hours. The mixture in the flask was slowly heated at atmospheric pressure for the purpose of removing methanol generated during hydrolysis. The methanol was collected in another flask following condensation in a tap water cooled condenser. Distillation was discontinued when the liquid in the flask had reached one hundred-sixty degrees Centigrade. The flask was allowed to cool to ambient temperature. The product in the flask was filtered for the purpose of removing calcium carbonate, activated charcoal, and calcium chloride salts formed in the neutralization step of the process. Filtration was accomplished using a laboratory scale pressure filter containing a one micron rated filter paper. The filtrate was a clear water white liquid having the composition shown in Table I Samples E–G.

TABLE I

| Material | Moles $H_2O$ Per Mole IBTMS | Methanol Percent | Monomer Percent | Dimer Percent | Trimer Percent | Tetramer Percent | Higher Oligomers | Neutralization Method | Residue Percent |
|---|---|---|---|---|---|---|---|---|---|
| IBTMS Feedstock | — | 1.19 | 97.37 | 1.14 | 0.3 | — | — | — | — |
| IBTMS Hydrolysis Product | | | | | | | | | |
| A | 0.5 | 21.1 | 15.33 | 41.72 | 16.49 | 3.94 | 0.2 | — | — |

TABLE I-continued

| Material | Moles H₂O Per Mole IBTMS | Methanol Percent | Monomer Percent | Dimer Percent | Trimer Percent | Tetramer Percent | Higher Oligomers | Neutralization Method | Residue Percent |
|---|---|---|---|---|---|---|---|---|---|
| B | 0.5 | 26.46 | 9.06 | 37.63 | 19.6 | 5.17 | 2.08 | — | — |
| C | 0.375 | 14.51 | 33.1 | 38.28 | 6.79 | 0.56 | — | — | — |
| D | 0.25 | 9.61 | 59.1 | 20.66 | 2.59 | 0.24 | — | — | — |
| Final Product | | | | | | | | | |
| E | 0.5 | — | 14.0 | 54.4 | 22.73 | 5.58 | 3.29 | CaCO₃ | 2–3 |
| F | 0.55 | — | 9.87 | 51.2 | 28.33 | 8.16 | 2.44 | CaCO₃ | 2–3 |
| G | 0.5 | 1.2 | 30.34 | 26.12 | 19.8 | 13.3 | 9.32 | NaOMe | 12 |

Note 1: Compositions determined by TCD Gas Chromatograph. Confirmed by GC mass spectroscopy.
Note 2: Silanol content of hydrolysis product free of methanol = 1000–1500 ppm (0.1%).
Note 3: IBTMS = isobutyltrimethoxysilane.
Note 4: NaOMe = sodium methylate.
Note 5: Residue = pentamers, hexamers, etc.

The amount of water employed in the process is a critical feature of the present invention. In order to obtain the most desirable distribution of alkoxy functional oligomers in the product, water should be employed in an amount of 0.1–0.6 moles of water per mole of silane monomer. Preferably the amount of water should be 0.25–0.5 moles of water per mole of silane monomer, and most preferably about 0.5 moles of water per mole of silane monomer. Samples A–D in Table I reflect the alkoxy functional oligomer distributions obtained with each of three ratios falling within the foregoing criteria.

Samples "A" and "B" in Table I differ from one another in that the amount of hydrochloric acid employed to catalyze the hydrolysis was 1.5 times more in "B" than in "A". It was noted that higher levels of chloride ion in the system increased the rate of hydrolysis which in turn effected the oligomer distribution. Higher levels of hydrochloric acid favor the formation of a higher alkoxy functional oligomer containing distribution. Thus, Sample "B" can be seen to reflect a lower level of monomer and a higher level of alkoxy functional oligomers following hydrolysis than Sample "A".

The use of a mild base such as calcium carbonate in order to neutralize the hydrolysis product is a critical feature in the maintenance of a stable product. The use of a mild base as in Samples "E" and "F" in Table I enables a molar excess of the base to be present during the distillation phase without a continuation of the reaction. However, a strong base such as sodium methylate in Sample "G" in Table I demonstrated that catalysis of the hydrolysis continued in the alkaline system producing higher alkoxy functional oligomers. This is reflected in the "Residue" analysis in Table I showing 3–4 times the amount of non-volatile residue for Sample "G" in contrast to Samples "E" and "F". If not completely removed prior to distillation, strong bases such as sodium hydroxide and sodium methylate foster the formation of higher molecular weight species, rendering it difficult to obtain a stable product. In contrast, a mild base enables one to more carefully stabilize the distribution of oligomers in the final product.

The amount of the acid catalyst employed in accordance with the process of the present invention ranges from about 250 to 1,000 parts per million. Neutralization is effected with the mild base in an amount of about 1.5 times the molar equivalent required.

The following example shows that by starting with a mixture of monomeric alkoxysilanes, alkoxy functional co-oligomers can be formed in accordance with the hydrolysis procedure in Example I. In Example II, trifluoropropyltrimethoxysilane referred to in Table II as $F_3PrSi(OMe)_3$, was mixed with isobutyltrimethoxysilane (IBTMS). The progress of the reaction was indicated by monitoring the level of monomer species and the formation of alkoxy functional oligomer combinations following hydrolysis. Table II shows the composition of the two feedstocks, the alkoxy functional co-oligomer hydrolysis product, and the final alkoxy functional co-oligomer product.

EXAMPLE II

Into a one thousand milliliter flask there was added 22.6 gram moles of isobutyltrimethoxysilane (IBTMS) and 0.92 gram moles of trifluoropropyltrimethoxysilane $F_3PrSi(OMe)_3$. The contents of the flask was agitated and there was added to the flask 25.0 grams of a thirty-six percent hydrochloric acid solution for the purpose of catalyzing the hydrolysis. Water was slowly added to the flask at ambient temperature (25 degrees Centigrade) in the amount of 11.1 gram moles. The reaction mixture exotherm during the addition of water to the flask and the maximum temperature attained was thirty-nine degrees Centigrade. The mixture was allowed to equilibrate at ambient temperature for four hours. Thirty-five grams of calcium carbonate was added to the agitated flask, accompanied by the addition of thirty grams of activated charcoal for the removal of chromophors from the product. The mixture was allowed to equilibriate at ambient temperature for four hours. The mixture in the flask was slowly heated at atmospheric pressure for the purpose of removing methanol generated during hydrolysis. The methanol was collected in another flask following condensation in a tap water cooled condenser. Distillation was discontinued when the liquid in the flask had reached one hundred-sixty degrees Centigrade. The flask was allowed to cool to ambient temperature. The product in the flask was filtered for the purpose of removing calcium carbonate, activated charcoal, and calcium chloride salts formed in the neutralization step of the process. Filtration was accomplished using a laboratory scale pressure filter containing a one micron rated filter paper. The filtrate was a clear water white liquid having the composition shown in Table II. Silanol content of the product was 1400 parts per million.

TABLE II

| Material | Methanol | IBTMS Monomer % | $F_3PrSi(OMe)_3$ Monomer % | Higher Oligomers % |
|---|---|---|---|---|
| IBTMS Feedstock | 1.19 | 97.37 | — | 1.4 |
| $F_3PrSi(OMe)_3$ Feedstock | 0.63 | — | 94.6 | 4.77 |
| Co-oligomer | 15.0 | 10.2 | 0.25 | 74.55 |

TABLE II-continued

| Material | Methanol | IBTMS Monomer % | F₃PrSi(OMe)₃ Monomer % | Higher Oligomers % |
|---|---|---|---|---|
| Hydrolysis Product Co-oligomer Final Product | — | 11.2 | — | 88.78 |

It will be apparent from the foregoing that many other variations and modifications may be made in the compounds, compositions, and methods described herein without departing substantially from the essential features and concepts of the present invention. Accordingly, it should be clearly understood that the forms of the invention described herein are exemplary only and are not intended as limitations on the scope of the present invention as defined in the appended claims.

That which is claimed is:

1. A method of making a mixture containing an alkoxysilane, alkoxy functional oligomers and silanols comprising the steps of forming a solution by combining water with a hydrolyzable silane monomer in a proportion of 0.1 to 0.6 moles of water per mole of silane monomer; adding an acid catalyst to the solution and partially hydrolyzing the silane monomer to form silanols and alcohol; simultaneously partially condensing the silanols to form alkoxy functional oligomers; neutralizing the solution by adding a mild base to the solution; heating the solution to a temperature sufficient to remove the alcohol from the solution; separating the mild base and any products of neutralization from the solution; and isolating a product in the form of an anhydrous organic solvent free mixture of residual hydrolyzable silane monomer, silanols formed by hydrolysis of the silane monomer, lower alkoxy functional oligomers formed by condensation of the silanols, and higher alkoxy functional oligomers formed by condensation of the silanols, the hydrolyzable silane monomer being an organotrialkoxysilane or a mixture of organotrialkoxysilanes selected from the group consisting of alkyltrialkoxysilanes having C1 to C20 alkyl groups on silicon; aryltrialkoxysilanes; and arylalkyltrialkoxysilanes.

2. The method according to claim 1 in which the organotrialkoxysilane is a compound selected from the group consisting of methyltrimethoxysilane, ethyltrimethoxysilane, propyltrimethoxysilane, isopropyltrimethoxysilane, butyltrimethoxysilane, isobutyltrimethoxysilane, pentyltrimethoxysilane, hexyltrimethoxysilane, phenyltrimethoxysilane, phenylethyltrimethoxysilane, chlorophenyltrimethoxysilane, trifluoropropyltrimethoxysilane, and chloropropyltrimethoxysilane.

3. The method according to claim 1 in which the product includes 10.0 to 65.0 percent by weight of residual hydrolyzable silane monomer; more than zero but less than about 0.1 percent by weight of silanols; 25.0 to 80.0 percent by weight of lower alkoxy functional oligomers; and 0.25 to about 10.0 percent by weight of higher alkoxy functional oligomers.

4. The method according to claim 1 in which the catalyst is selected from the group consisting of hydrochloric acid, acetic acid, oxalic acid, and trichloroacetic acid; and the mild base is selected from the group consisting of calcium carbonate, sodium carbonate, sodium bicarbonate, ammonium carbonate, sodium borate, sodium acetate, calcium hydroxide, calcium acetate, potassium acetate, and ammonium acetate.

5. The method according to claim 4 in which the catalyst is hydrochloric acid; the mild base is calcium carbonate; the mild base and any neutralization products are separated from the solution by filtration; and in which the water is combined with the hydrolyzable silane monomer in a proportion of 0.25 to 0.5 moles of water per mole of silane monomer.

6. A method which comprises contacting a hydrolyzable silane monomer with water in a proportion of 0.1 to 0.6 moles of water per mole of silane monomer in the presence of an acid catalyst to partially hydrolyze the silane monomer and condense the hydrolysis product obtained; neutralizing the product obtained by the addition of a mild base to the product; heating the product to a temperature sufficient to remove any alcohol present in the product; separating the mild base and any products of neutralization from the product; and isolating the product in the form of an anhydrous organic solvent free mixture, the hydrolyzable silane monomer being an organotrialkoxysilane or a mixture of organotrialkoxysilanes selected from the group consisting of alkyltrialkoxysilanes having C1 to C20 alkyl groups on silicon; aryltrialkoxysilanes; and arylalkyltrialkoxysilanes.

7. The method according to claim 6 in which the organotrialkoxysilane is a compound selected from the group consisting of methyltrimethoxysilane, ethyltrimethoxysilane, propyltrimethoxysilane, isopropyltrimethoxysilane, butyltrimethoxysilane, isobutyltrimethoxysilane, pentyltrimethoxysilane, hexyltrimethoxysilane, phenyltrimethoxysilane, phenylethyltrimethoxysilane, chlorophenyltrimethoxysilane, trifluoropropyltrimethoxysilane, and chloropropyltrimethoxysilane.

8. The method according to claim 6 in which the catalyst is selected from the group consisting of hydrochloric acid, acetic acid, oxalic acid, and trichloroacetic acid; and the mild base is selected from the group consisting of calcium carbonate, sodium carbonate, sodium bicarbonate, ammonium carbonate, sodium borate, sodium acetate, calcium hydroxide, calcium acetate, potassium acetate, and ammonium acetate.

9. The method according to claim 8 in which the catalyst is hydrochloric acid; the mild base is calcium carbonate; and the mild base and any neutralization products are separated from the product by filtration.

10. The method according to claim 6 in which the hydrolyzable silane monomer is contacted with water in a proportion of 0.25 to 0.5 moles of water per mole of silane monomer.

11. The method according to claim 6 in which the product includes 10.0 to 65.0 percent by weight of residual hydrolyzable silane monomer; more than zero but less than about 0.1 percent by weight of silanols; 25.0 to 80.0 percent by weight of lower alkoxy functional oligomers; and 0.25 to about 10.0 percent by weight of higher alkoxy functional oligomers.

* * * * *